May 24, 1960 T. CYMMER 2,937,912
DEVICE FOR MAKING A RECORD AND DISPLAYING IT
Filed May 14, 1954 3 Sheets-Sheet 1

INVENTOR.
THOMAS CYMMER
BY George Sipkin
B. L. Longwill
ATTORNEYS

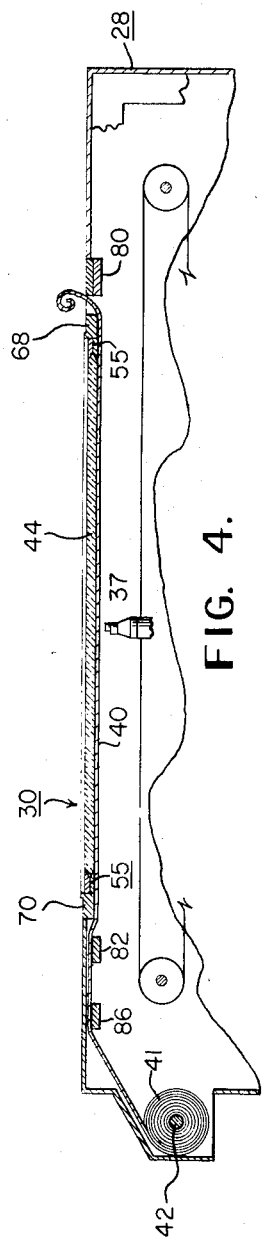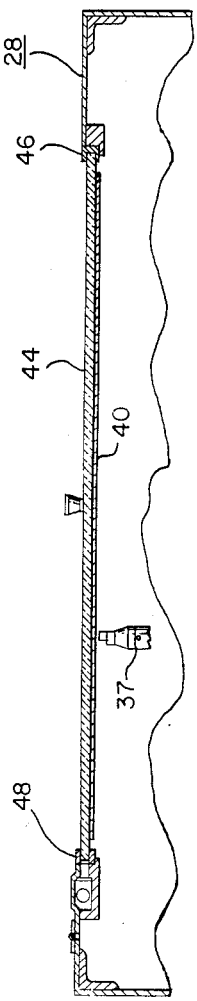

May 24, 1960 T. CYMMER 2,937,912
DEVICE FOR MAKING A RECORD AND DISPLAYING IT
Filed May 14, 1954 3 Sheets-Sheet 3

INVENTOR.
THOMAS CYMMER
BY George Sipkin
B. L. Tanquell
ATTORNEYS

United States Patent Office 2,937,912
Patented May 24, 1960

2,937,912

DEVICE FOR MAKING A RECORD AND DISPLAYING IT

Thomas Cymmer, 125 Paterson Road, Fanwood, N.J.

Filed May 14, 1954, Ser. No. 429,998

10 Claims. (Cl. 346—8)

(Granted under Title 35, U.S. Code (1952), sec. 266)

The invention described herein may be manufactured and used by or for the Government of the United States of America for governmental purposes without the payment of any royalties thereon or therefor.

This invention relates to a device for making a record of selected information and displaying it, and also particularly to a point by point plotter for recording on a plotting chart, successive positions of one or more objects and enabling evaluation of the same, during the recording operation, with reference to a basic object. In a specific use application, it may be used advantageously as part of the automatic plotting device illustrated, described and claimed in the copending application of Bernard J. Baecher, Serial No. 430,003, filed concurrently herewith.

An object of the invention is to provide improved means for making a record of selected information and displaying it, which information may be changing continuously or at intervals, in which all recorded information is continuously visible, even while further recording is taking place, with which access may be had at all times, including the time while recording is taking place, to the front face from which the recorded information is visible for evaluation of the recorded material and the making of further record marks on said front face of the device, and which will be relatively simple, compact, practical, convenient, and inexpensive.

A further object is to provide an improved means for recording changing data and making it visible where it is accessible for evaluation and comparison, which may be compared, whenever desired, with a reference image, and which will be convenient, compact, and easily operated.

Other objects and advantages will be apparent from the following description of one embodiment of the invention, and the novel features will be particularly pointed out hereinafter in connection with the appended claims.

A device embodying the principles of the invention includes a panel comprising a plastic pane, preferably of glass, an acrylic resin of which polymerized methyl methacrylate is an example, which is sold under trademarks such as Lucite and Plexiglas. Preferably the pane is of the polymerized methyl methacrylate or similar material fitting a casing frame. The sign further comprises a waxed fabric or sheet which covers a face of the plastic pane with the waxed side immediately adjacent the plastic pane. The wax-fabric can be made to adhere, if desired, to the plastic pane in any suitable manner; but in accordance with the invention use is made of an electrostatic charge that is induced to the plastic pane. Printing mechanism that operates momentarily against the sheet impresses a preformed mark or impression of wax onto a face of the plastic pane. The device also comprises edge-illuminating means which causes the wax impressions or marks to be clearly and constantly visible from the side or face of the pane which is opposite the waxed sheet. The display or record can be seen without interfering shadows from the printing mechanism which, consequently, can be of a type that operates rapidly, automatically, and continuously. The waxed fabric or paper preferably is translucent.

Figure 2:
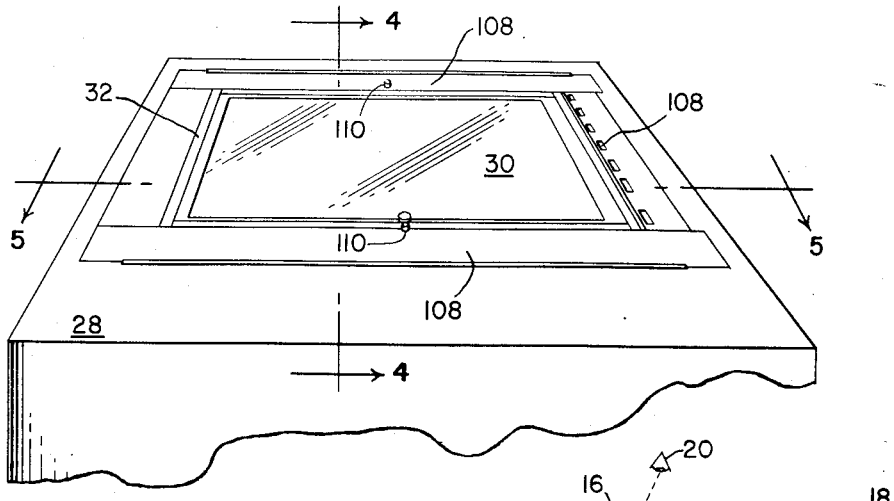
Figure 2 is a plan view of actual apparatus embodying principles of the invention.
Figure 9:
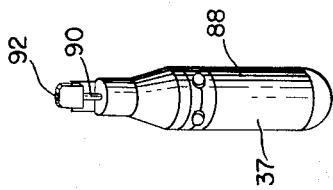
Figure 6:
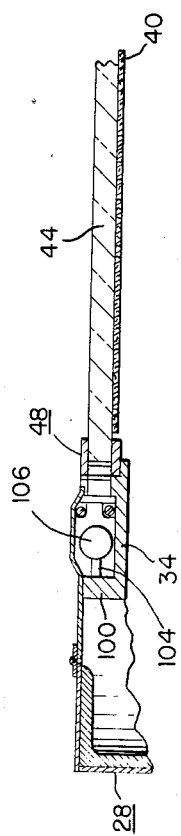
Figure 7:
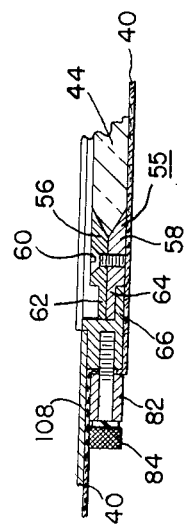
Figure 8:
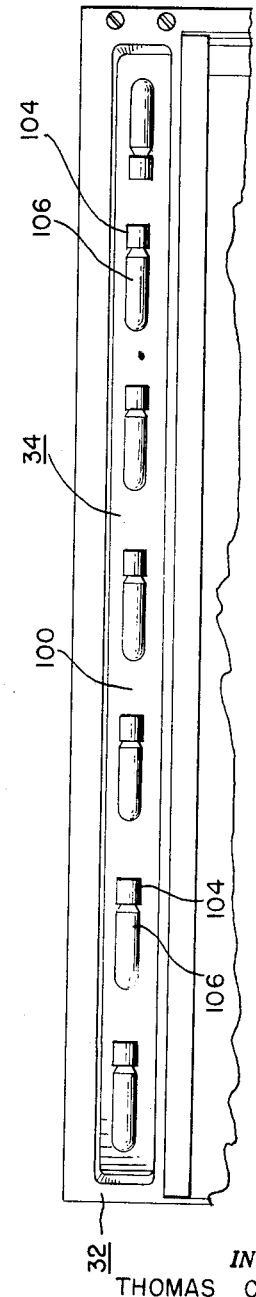

Figures 4 and 5 are sectional views substantially along the lines 4—4 and 5—5, respectively, of Figure 2;

Figures 6 and 7 are more detailed views of parts of Figures 5 and 6, respectively;

Figure 8 is a partial frontal view of an arrangement of lighting means in the casing frame for edge-lighting the marking pane; and Figure 9 is a perspective view of a printing element utilizable for impressing a character on the marking panel.

Figure 1:
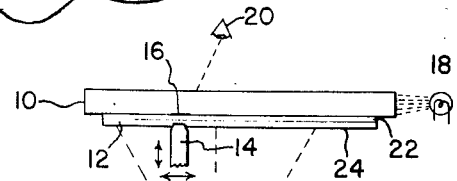
Figure 1 is a schematic view broadly indicating the invention.
Figure 3:
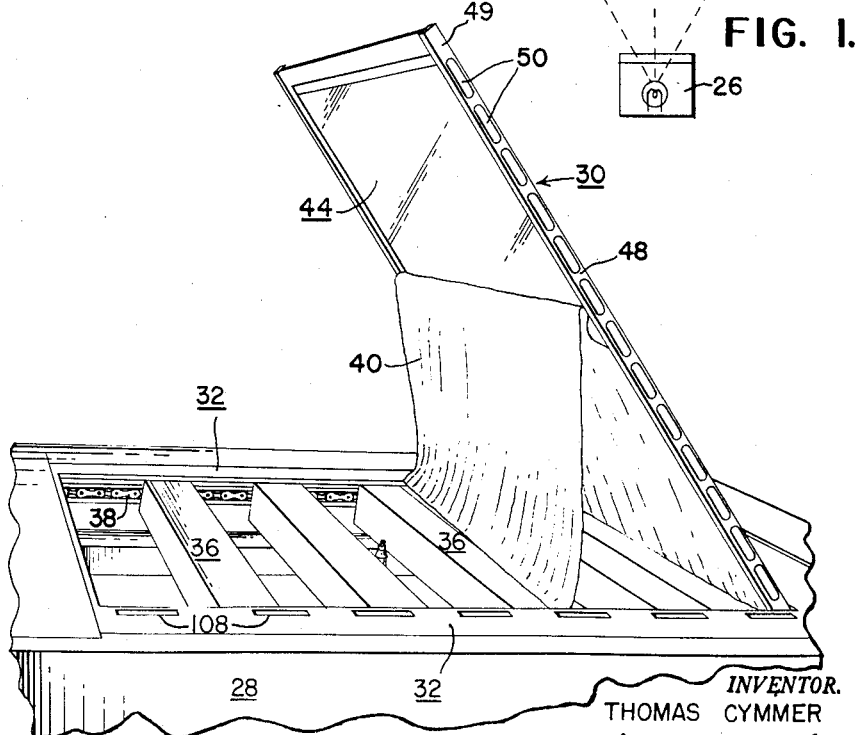
Figure 3 is a partial elevational view of the apparatus, the figure being arranged to illustrate the adherence of the waxed sheet to the marking panel.

In general, equipment in accordance with the principles of the invention is broadly illustrated in Figure 1 wherein the parts are shown exaggerated. In Figure 1 a transparent or translucent pane 10 is backed with a translucent waxed fabric or paper 12. In this and other figures, the thickness of the fabric is exaggerated for clarity of illustration. A printer 14 with raised lines representing a symbol can be raised and lowered so as to impress a mark on the fabric or paper. The pressure of the printer passes through the paper and leaves a waxed mark or impression 16 on the underneath face of the pane 10, in which some of the wax along the line of impression is transferred to and caused to adhere to the pane. Edge illuminating means 18 causes the adhering wax lines on the pane to be visible to the eye 20 as a glow at the front of the pane.

The fabric 12 can, if desired, be of a kind having an upper waxed layer 22 and a lower dull layer 24 that can receive and hold printing ink. By inking the printer 14, it will make a permanent printed mark or impression on the lower dull face of the paper or fabric 12. The printer can be moved in different crosswise directions parallel to the faces of the pane, this movement being indicated in the drawings by the arrows close to it.

By making the fabric 12 at least translucent throughout, an optical projection means 26 can be provided in back of the pane 10 and paper or fabric 12 for illuminating the marks left by the printer, and also projecting upon the paper and pane an image of a reference object.

The invention has been actually utilized in a dead-reckoning target plotter which forms the subject matter of the aforesaid application of Bernard J. Baecher, which is hereby incorporated by reference. Consequently, a preferred form of the invention is shown which constitutes a portion of said plotter, but the invention is not limited thereto. The plotter comprises a housing or casing, a top portion only of which is shown in some of the figures of the drawings, details being omitted in other figures. This top portion 28 incorporates a changeable indicating board, screen of chart embodying the invention. This chart or screen comprises a rectangular panel 30, and a rectangular main frame 32 on the casing with an opening into which the panel 30 can seat. The panel may be hinged or otherwise movably associated with the casing top portion 28. The chart further comprises an illuminating means forming part of the frame 32 and providing edge-illumination for the panel 10, and comprises a marking means for making marks on the panel.

The illuminating means is indicated in Figures 6 and 8 in its entirety by the reference numeral 34 and is along substantially a full single side of the frame 12, forming a part thereof. The marking means comprises one or more marking or printing mechanisms 36 comprising a printer unit 37 with raised printing lines representing the symbol to be printed movable under and across the panel 30 by any suitable printing moving mechanism represented by reference numeral 38, and comprises a record portion 40 of a roll 41 of waxed paper carried on a wind-off or feed reel 42 secured to the casing. A particular form of printer moving mechanism is disclosed in the aforesaid application of Baecher.

The panel 30 comprises a window or pane 44 of any transparent or translucent plastic such as glass, Lucite or similar substance. One that becomes electrically charged with static electricity when rubber with a small piece of wool is preferred. In the preferred embodiment Lucite is used. The panel 30 further comprises an assembled frame for the pane 44; the frame comprising a channel 46 receiving an edge of the pane 44 and a channel structure 48 receiving the opposite edge of the pane. The latter edge is adapted to lie adjacent the illuminating means 34. As indicated in Figures 2, 5 and 6, the channel structure 48 has a transverse member 49 provided with a plurality of openings or slots 50. The pane-receiving frame of the panel 30 further comprises opposite pairs 55 of cooperating bars 56 and 58. The pairs 55 of the bars are generally similar; and as shown in Figure 7 the bars have edges for holding each of the remaining edges of the pane 44. The upper bars 56 are removably secured to the lower bars 58 by a plurality of screws 60. The cooperating pairs of bars 56 and 58 are beveled to provide grooves for receiving correspondingly shaped edges of the pane 44 in a manner that provides a flush construction or planar alignment for the undersides of the pane 44 and the bars 58 of the pairs 55 in the direction in which the waxed paper 40 can unreel.

To maintain this flush construction when the panel 30 is in place in the main frame 32, the pairs 55 of bars 56 and 58 are supported through mating extensions 62 and 64 on the bars that rest on elongated ledges 66 of a pair of bar members 68 and 70 comprising opposite sides of the frame 30. The underside faces of these bars 68 and 70 are also flush with the lower face of pane 44.

The waxed paper is preferably somewhat narrower than the panel 30 so that it can lie flush against the pane 44 between channel 46 and channel structure 48, as indicated in Figure 5. The paper is preferably a laminated structure having a waxed paper upper layer and a paper backing sheet on the lower side. The portion 40 of the paper is kept taut and smooth against the pane with its waxed side against the pane, and a fresh portion is applied whenever desired by unreeling of the roll 41. To these ends, the paper ends are clamped by bars 82 as indicated in Figure 7. Hand-operated clamping screws 84 at the extreme ends of the clamp bars 82 thread into the bar members 68 and 70. When the screws 84 are loosened, as much waxed paper as desired can be pulled off the reel 41 in an obvious manner, the paper rolling over any suitable guides such as 86. The record portion of the paper can be held against the pane 44 by a static charge established on the Lucite pane 24. To this end, the pane is first rubbed with a piece of soft wool, silk, rubber or similar material to induce a static charge thereon. The screws 84 nearest the roll 41 can then be tightened, the paper pulled taut and against the pane 44, and finally the remaining screws 84 associated with the bar 68 tightened. The panel can then be closed and the sign is prepared for marking.

Printing is accomplished by the printing mechanism 37 which comprises a solenoid 88. The solenoid, when first energized, raises its core 90 upward. The core 90 has any desired raised type character 92 at its top, and this character is forcibly driven against the paper backed side of the record portion 40. The waxed surface of the record portion 40 is thus forced into pressurized contact with the lower face of the Lucite pane 44. The wax directly over the type character is pressed firmly against the pane and a wax mark or replica is transferred to and adheres to the surface of the plastic material that corresponds to the type character. This mark produces an impression or discontinuity in the otherwise smooth surface of the pane 44. An ink print can be made at the same time on the paper backing of the record sheet, by first inking the type character, by causing it to be reciprocated endwise, momentarily, in passing against an inking pad 80 (Fig. 4), as is described in the aforesaid Baecher application.

The printing mechanism 37 can be arranged to be moved repetitively along the underside of the panel 30, and several of them can be and preferably are used. They move in succession beneath and across the panel 30.

The waxed impression or discontinuity on the panel 30 is visible from the outside as a glow when the panel is illuminated from an edge. This is accomplished by the illuminating means 34 which comprises a suitable elongated chamber 100 in the casing frame 32. The chamber 100 is open on the side toward the panel 30, and contains a plurality of sockets 104 electrically connected to a source of electric power in any suitable manner and receiving a plurality of incandescent bulbs 106. Light from the bulbs passes through the numerous slots 50 in the panel 30 for edge-illumination of the pane 40. The top of chamber 100 may have openings 108a for ventilation.

The panel 30 may be secured in place in the frame 32 of the casing by a plurality of strips 108 that can be screwed or latched by manually operated latches 110 against edges of the panel 30. The loosening of the latches and removal of the strips provides easy access to frame-parts inside the casing while the panel is in place. However, the main casing can also have access doors.

Obviously many modifications and variations of the present invention are possible in the light of the above teachings. It is therefore to be understood, that within the scope of the appended claims, the invention may be practiced otherwise than as specifically described.

What is claimed is:

1. Apparatus of the type described comprising a pane of transparent polymerized methyl methacrylate; illuminating means; means for supporting said illuminating means adjacent to the periphery of said pane whereby light emitted from said illuminating means enters said pane edgewise through its periphery; a laminated sheet including a layer of wax a layer of light transmitting supporting material for the wax, said layer of supporting material having an exposed surface capable of fixedly retaining visible marking material applied to its surface; said laminated sheet being disposed and retained alongside of and face to face against one surface of said pane with its wax layer between said pane and said layer of supporting material; and marking means adjacent and in front of said laminated sheet and having a printing element carrying raised lines representing a symbol operable into and out of contact with said supporting material for forcing selected points of said sheet against said pane with force sufficient for causing wax from said sheet to be pressed onto and to adhere to the surface of said pane along said raised lines and for simultaneously depositing any marking material carried on said lines to the exposed surface of said layer of supporting material along said raised lines, said marking means being selectively movable in directions parallel to the faces of said pane.

2. In a point by point plotter for making a record on a plotting chart of successive positions of one or more objects and enabling evaluation of the same during the plotting, with reference to a basic object, the combination of a plate of a material through which light passes easily, means for applying light rays edgewise to said plate and in a direction parallel to the faces of said plate to illuminate the plate, a sheet of thin flexible material having a wax coating on one face thereof disposed with its wax coated face flat against, and confined face to face with one face of said plate, the other face of said sheet being exposed, printing means disposed adjacent, but spaced from, said one face of said plate and thin sheet, means mounting said printing means for movement across the exposed face of said sheet in selected crosswise direction, parallel to said plate face and having a printing element carrying a selected printing symbol movable, when activated, in a direction toward and from said plate while in any of its positions in proximity to said exposed face of said sheet to cause an impact of said symbol against said sheet and plate, in a direction normal to the faces of the plate, that is sufficient in force to transfer some of the wax coating of said sheet, in lines corresponding to the lines of said symbol, to said one face of said plate, which lines of adherent wax become visible from in front of said plate opposite from said sheet under said edgewise illumination of said plate, the opposite face of said plate being continuously uncovered and exposed to enable one to mark thereon with a suitable marking means, to make measurements between different wax printed positions, and to study and evaluate the effect of changes in the positions of the wax printings on said plate.

3. In a printing and display device in which symbols representing successive values of variables are recorded and displayed on a chart, that improvement which comprises a housing having in an outside wall thereof a light transmitting plate, exposed on its outer face, means for applying light rays edgewise to the interior of said plate in a direction parallel to the faces of the plate to illuminate the plate by edgewise illumination, a sheet of thin flexible material confined in face to face abutting relation with the inner face of said plate and having a wax coating on its face that abuts said plate, printing means in said housing, selectively shiftable in crosswise directions parallel to said plate, and having a printing element with raised printing lines corresponding to a selected symbol on its printing face, said element when activated being operable to press said raised lines against said sheet, in a direction approximately normal to the face of said sheet, with sufficient impact to transfer some of the wax coating of the sheet along the raised lines of the printing element to the inner face of said plate, whereby the resultant symbol wax lines of the inner face of said plate will become visible through the exposed face of said plate under the light rays supplied edgewise to said plate.

4. A recording and display device comprising a housing having a display opening, a light transmitting plate disposed across said opening and exposed on its outer face, means for applying light rays edgewise to the interior of said plate in a direction parallel to the faces of the plate to illuminate the plate by edgewise illumination, a sheet of thin light transmitting paper confined in face to face relation against the inner face of said plate and having a light-transmitting wax-like coating on its face that abuts said plate, printing means in said housing shiftable therein selectively in crosswise directions parallel to said plate, and having a printing element operable when activated to press raised lines on its printing face against said sheet with an impact sufficient to transfer some of the wax of said coating, along the lines of such impact, to the inner face of said plate where the transferred wax lines will be visible from the front face of the plate under said light rays supplied edgewise to said plate, and means also in said housing movable in crosswise directions parallel to said plate for projecting a light image on said paper for comparison with said printed wax lines from the exterior of said housing.

5. The device as set forth in claim 4, wherein the face of said paper sheet that is opposite from said wax coating has a surface which will receive and hold printing ink applied thereto, and means by which after printing ink has been applied to said raised lines of said printing element, the latter when activated will, in its impact against said sheet also print a corresponding symbol on the paper sheet as a permanent record.

6. A device for making a record of selected information and displaying it, which comprises a plate of light transmitting material, means for directing light rays into said plate edgewise thereof and in a direction parallel to its faces to illuminate said plate by edgewise illumination, a thin flexible sheet confined face to face against and covering one face of said plate and having a transferable wax layer on its face abutting said plate, and means selectively movable along the exposed face of said sheet in directions parallel to the faces of said plate and operable during any of such movement to press said sheet against said plate with line pressure and transfer to said covered face of said plate, and cause to adhere thereto, by such pressure, wax from said coating corresponding to the lines of said pressure, whereby said lines of wax on the covered face of said plate will be visible by the edgewise illumination of said plate from in front of the uncovered face of said plate.

7. A device for making a record of selected information and displaying it, which comprises a plate of light transmitting material, means for directing light rays into said plate edgewise thereof and in a direction parallel to its faces to illuminate said plate by edgewise illumination, and a thin flexible sheet confined face to face against and covering one face of said plate and having a transferable wax layer on its face abutting said plate, said plate having its face that is opposite from said sheet uncovered for viewing and access thereto and marking thereon, whereby when said sheet is indented by line pressure against said plate, the pressure will cause transfer of some of the wax on the sheet to the covered face of the plate and adhere thereto along lines corresponding to the pressure lines, which transferred wax lines will be visible by said edgewise illumination of said plate, from a position in front of said plate.

8. The device as set forth in claim 7, wherein said sheet is wax paper, and said plate is of a material which may be electrically charged with static electricity to cause said paper to adhere thereto over approximately their entire abutting faces.

9. The device as set forth in claim 6 wherein said sheet is paper, and said plate is of a material which may be electrically charged with static electricity to cause said paper to adhere thereto over approximately the entire abutting faces of the plate and paper.

10. The device as set forth in claim 6, wherein said sheet is of light transmitting paper and its face opposite from the wax layer has a surface which will receive and hold a marking material, and the part of said movable means which applies said line pressure is a marking device which leaves a permanent visible record of said applied lines on said wax paper.

References Cited in the file of this patent

UNITED STATES PATENTS

| | | |
|---|---|---|
| 1,279,820 | Brassard | Sept. 24, 1918 |
| 1,931,742 | Scharringhausen | Oct. 24, 1933 |
| 2,035,768 | Sherman et al. | Mar. 31, 1936 |
| 2,413,300 | Dunn et al. | Dec. 31, 1946 |
| 2,451,979 | Rosenblum | Oct. 19, 1948 |
| 2,508,725 | Newman | May 23, 1950 |
| 2,525,094 | Caldwell | Oct. 10, 1950 |
| 2,566,458 | Macau | Sept. 4, 1951 |
| 2,573,881 | Walkup et al. | Nov. 6, 1951 |
| 2,576,882 | Koole et al. | Nov. 27, 1951 |
| 2,588,572 | Potteiger | Mar. 11, 1952 |
| 2,629,043 | Holtje | Feb. 17, 1954 |

FOREIGN PATENTS

| | | |
|---|---|---|
| 337,445 | Germany | May 31, 1921 |